(12) United States Patent
Kasahara

(10) Patent No.: US 10,691,389 B2
(45) Date of Patent: Jun. 23, 2020

(54) INFORMATION PROCESSING APPARATUS THAT, DEPENDING ON THE SIZE OF COLLECTED DATA IN A FIRST DATA FORMAT, CONVERTS THE DATA TO A SECOND DATA FORMAT BEFORE TRANSMISSION, METHOD FOR CONTROLLING THE SAME, AND STORAGE MEDIUM

(71) Applicant: CANON KABUSHIKI KAISHA, Tokyo (JP)

(72) Inventor: Kimito Kasahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/285,594

(22) Filed: Feb. 26, 2019

(65) Prior Publication Data
US 2019/0265931 A1 Aug. 29, 2019

(30) Foreign Application Priority Data
Feb. 28, 2018 (JP) ................................ 2018-035420

(51) Int. Cl.
*G06F 3/12* (2006.01)
*G06F 11/34* (2006.01)

(52) U.S. Cl.
CPC .......... *G06F 3/1294* (2013.01); *G06F 3/1295* (2013.01); *G06F 11/3476* (2013.01)

(58) Field of Classification Search
None
See application file for complete search history.

(56) References Cited

U.S. PATENT DOCUMENTS

| 2011/0026942 A1* | 2/2011 | Naito .................. G06F 11/0733 399/8 |
| 2013/0163032 A1* | 6/2013 | Hamano ............... G06F 3/1296 358/1.14 |
| 2013/0215465 A1* | 8/2013 | Mutsuno ............... G06F 3/1204 358/1.15 |
| 2014/0036309 A1* | 2/2014 | Oguma ..................... G06F 3/12 358/1.15 |
| 2015/0043036 A1* | 2/2015 | Kamma ................ G06F 3/1206 358/1.15 |
| 2015/0178030 A1 | 6/2015 | Kasahara |
| 2017/0017560 A1* | 1/2017 | Takahashi .......... G05B 23/0221 |

FOREIGN PATENT DOCUMENTS

JP 2009009448 A 1/2009

OTHER PUBLICATIONS

Copending, Unpublished U.S. Appl. No. 16/154,937, to Kimito Kasahara, filed Oct. 9, 2018.

* cited by examiner

*Primary Examiner* — Dung D Tran
(74) *Attorney, Agent, or Firm* — Venable LLP

(57) ABSTRACT

An information processing apparatus collects data produced in association with processing carried out by the information processing apparatus, and buffers the collected data in a first data format. The first data format is different from a second data format used for transmission to an external server apparatus. The information processing apparatus converts the format of the buffered data from the first data format to the second data format before transmitting the buffered data to the server apparatus. Then, the information processing apparatus transmits the data in the second data format to the server apparatus as an event log of the information processing apparatus.

7 Claims, 5 Drawing Sheets

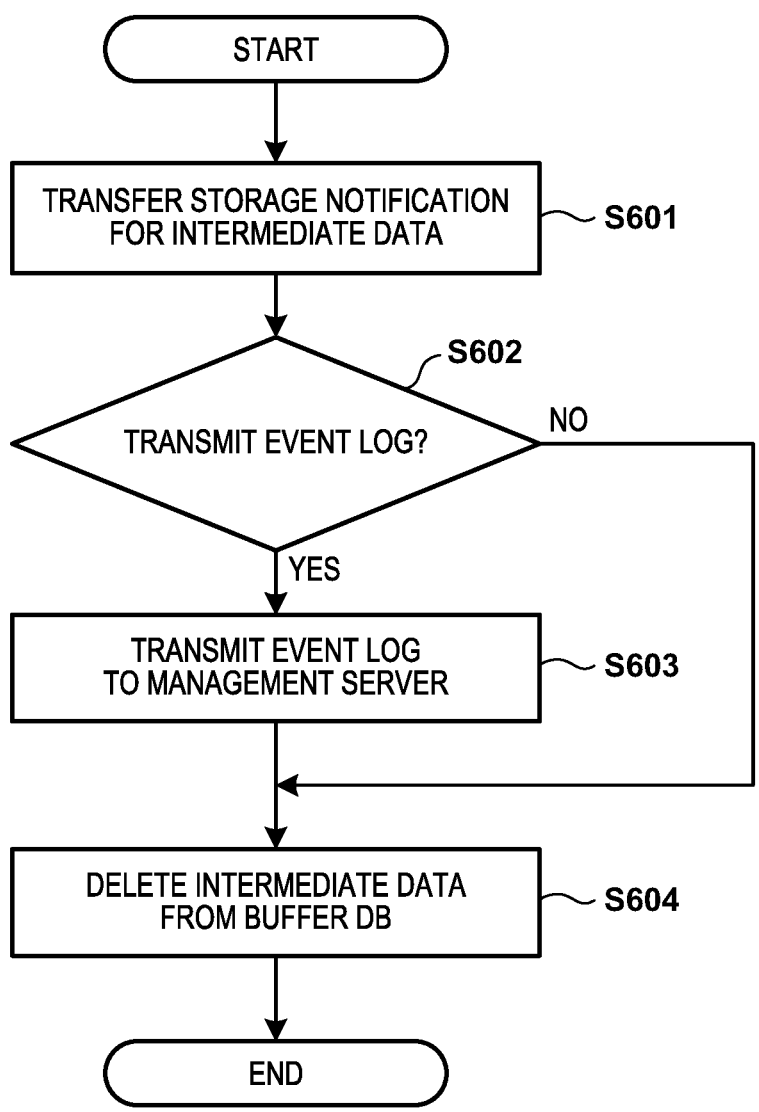

INFORMATION PROCESSING APPARATUS THAT, DEPENDING ON THE SIZE OF COLLECTED DATA IN A FIRST DATA FORMAT, CONVERTS THE DATA TO A SECOND DATA FORMAT BEFORE TRANSMISSION, METHOD FOR CONTROLLING THE SAME, AND STORAGE MEDIUM

BACKGROUND OF THE INVENTION

Field of the Invention

The present invention relates to an information processing apparatus, a method for controlling the same, and a storage medium.

Description of the Related Art

Recently, in image forming apparatuses such as multifunction peripherals, data pertaining to the details of various processes carried out within the apparatus is collected, and the collected data is transmitted to a management server as an event log, for the purpose of remotely ascertaining the state of the apparatus. For example, Japanese Patent Laid-Open No. 2009-9448 proposes a technique in which a node to be monitored by a monitoring server carries out format conversion on log messages in multiple types of formats, and the log messages in the unified format are then transmitted to the monitoring server.

In networks where an information processing apparatus such as the above-described image forming apparatus communicates with a management server, such as in the Internet, there are typically situations where the communication speed drops or communication is cut off. To prepare for such situations, it is necessary for the image forming apparatus to temporarily accumulate (buffer) the event logs collected in the apparatus in a buffer region until the logs have been successfully transmitted to the management server.

However, when transmitting event logs to the management server, it is necessary to use a data format that is easy for the management server to process, and a data format having a relatively large data size is typically used. Thus a large-size buffer region is required in order to accumulate the event logs in the buffer region using such a data format.

SUMMARY OF THE INVENTION

The present invention has been achieved in light of the above-mentioned problems. The present invention provides a technique for transmitting event logs in a data format suited to a server apparatus while efficiently buffering the event logs within an information processing apparatus.

According to one aspect of the present invention, there is provided an information processing apparatus comprising: a memory storing instructions, and at least one processor executing the instructions causing the information processing apparatus to: collect data produced in association with processing carried out by the information processing apparatus; buffer the collected data in a first data format, the first data format being different from a second data format used for transmission to an external server apparatus; convert the format of the buffered data from the first data format to the second data format before transmitting the buffered data to the server apparatus; and transmit the data in the second data format to the server apparatus as an event log of the information processing apparatus.

According to another aspect of the present invention, there is provided a method for controlling an information processing apparatus, the method comprising: collecting data produced in association with processing carried out by the information processing apparatus; buffering the collected data in a first data format, the first data format being different from a second data format used for transmission to an external server apparatus; converting the format of the buffered data from the first data format to the second data format before transmitting the buffered data to the server apparatus; and transmitting the data in the second data format to the server apparatus as an event log of the information processing apparatus.

According to still another aspect of the present invention, there is provided a non-transitory computer-readable storage medium storing a computer program for causing a computer to execute a method for controlling an information processing apparatus, the method comprising: collecting data produced in association with processing carried out by the information processing apparatus; buffering the collected data in a first data format, the first data format being different from a second data format used for transmission to an external server apparatus; converting the format of the buffered data from the first data format to the second data format before transmitting the buffered data to the server apparatus; and transmitting the data in the second data format to the server apparatus as an event log of the information processing apparatus.

According to the present invention, a technique for transmitting event logs in a data format suited to a server apparatus while efficiently buffering the event logs within an information processing apparatus can be provided.

Further features of the present invention will become apparent from the following description of exemplary embodiments (with reference to the attached drawings).

BRIEF DESCRIPTION OF THE DRAWINGS

FIG. 6 is a flowchart illustrating a processing sequence for transmitting event logs to a management server.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

The following first and second embodiments will describe examples in which the present invention is applied in an image forming apparatus. Note that the present invention can be applied in any information processing apparatus, e.g., not only in an image forming apparatus (image processing apparatus) such as a printing apparatus, a copier, a multifunction peripheral, a facsimile apparatus, or the like, but also in an information device such as a PC, a server apparatus, or the like.

First Embodiment

System Configuration

Figure 1:
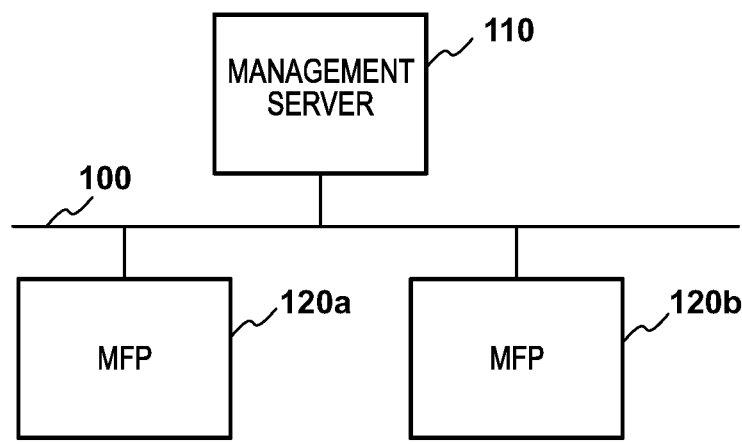
FIG. 1 is a diagram illustrating an example of the configuration of a communication system.

FIG. 1 is a diagram illustrating an example of the configuration of a communication system according to embodiments of the present invention. In the communication system illustrated in FIG. 1, an event log management server (called a "management server" hereinafter) 110 and multifunction peripherals (MFPs) 120a and 120b are connected to a network 100, and are capable of communicating with each other over the network 100. The network 100 can be a wired LAN (local area network) and the Internet, for example.

The management server 110 is a server apparatus that manages event logs of client apparatuses such as the MFPs 120a and 120b. An application for collecting jobs executed by the client apparatuses or history information of user operations as event logs and analyzing the collected event logs is installed in the management server 110. This application collects and analyzes event logs transmitted from the MFPs 120a and 120b over the network 100.

The MFPs 120 (120a and 120b) are information devices having a plurality of functions, such as printing, copying, scanning, facsimile (fax) transmission, and so on. The MFPs 120 furthermore have a function for holding an execution history for each function, a function for holding setting values used by each function, and a function for transmitting the execution history and the setting values to the management server 110.

MFP Configuration

Figure 2:
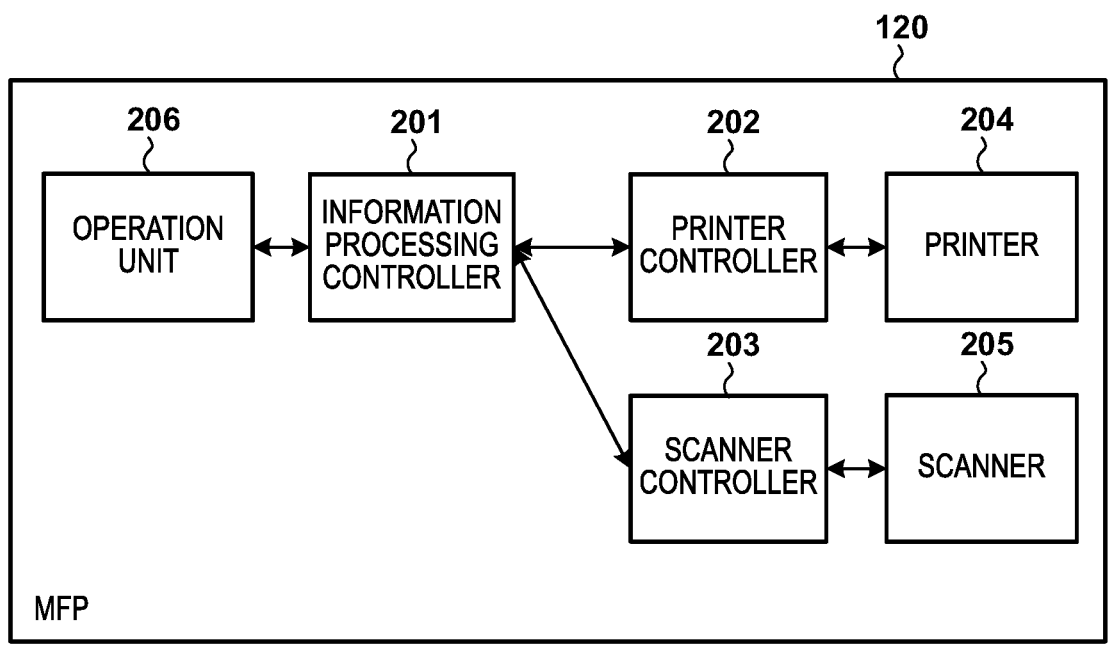
FIG. 2 is a block diagram illustrating an example of the hardware configuration of an MFP.

FIG. 2 is a block diagram illustrating an example of the hardware configuration of the MFPs 120 according to the present embodiment. Each MFP 120 includes an information processing controller 201, a printer controller 202, a scanner controller 203, a printer 204, a scanner 205, and an operation unit 206. The information processing controller 201 controls information processing pertaining to the operations of the MFP 120. The information processing controller 201 is connected to the printer controller 202, the scanner controller 203, and the operation unit 206. The printer controller 202 controls the printer 204, which is an image output device. The scanner controller 203 controls the scanner 205, which is an image input device.

Figure 3:
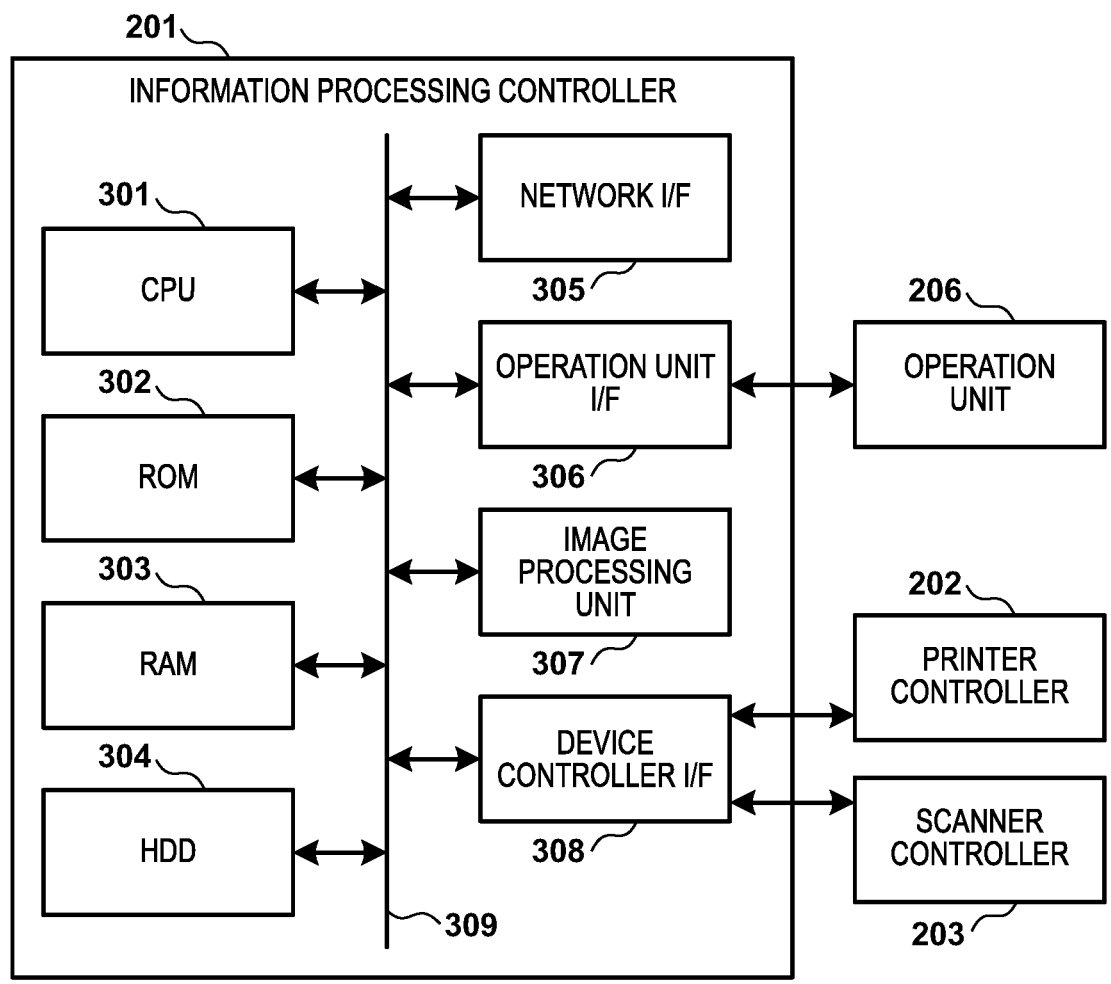
FIG. 3 is a block diagram illustrating an example of the hardware configuration of an information processing controller.

FIG. 3 is a block diagram illustrating an example of the hardware configuration of the information processing controller 201. The information processing controller 201 includes a CPU 301, ROM 302, RAM 303, and an HDD (hard disk drive) 304. The information processing controller 201 further includes a network interface (I/F) 305, an operation unit I/F 306, an image processing unit 307, and a device controller I/F 308. These devices are connected to a system bus 309.

The CPU 301 launches an OS by executing a boot program stored in the ROM 302. The ROM 302 is constituted by flash memory such as eMMC and a controller thereof. The ROM 302 stores control programs that are executed by the CPU 301. The CPU 301 executes various types of processes by executing, in the OS, application programs stored in the ROM 302 or the HDD 304. The RAM 303 provides a work area for the CPU 301 and provides an image memory area for temporarily storing image data. The above-described application programs, image data, and various types of setting values are stored in the ROM 302 or the HDD 304. Note that there are cases where the MFP 120 is not provided with the HDD 304.

The operation unit I/F 306 is an interface with the operation unit 206. The operation unit 206 includes a display (display unit) having touch panel functionality. The operation unit I/F 306 outputs to the operation unit 206 screen data of screens to be displayed in the operation unit 206. Additionally, the operation unit I/F 306 transmits information, which has been input by a user through the operation unit 206, to the CPU 301.

The printer controller 202 and the scanner controller 203 are connected to the device controller I/F 308. The device controller I/F 308 subjects the image data to synchronous/asynchronous conversion. The network I/F 305 is connected to the network 100, and communicates (input/outputs information) with external apparatuses such as the management server 110 over the network 100. The image processing unit 307 carries out image processing on image data to be output to the printer 204 and image data input from the scanner 205. The image processing unit 307 carries out processing such as image rotation, image compression, resolution conversion, color space conversion, tone conversion, and the like.

MFP Software Configuration

Figure 4:
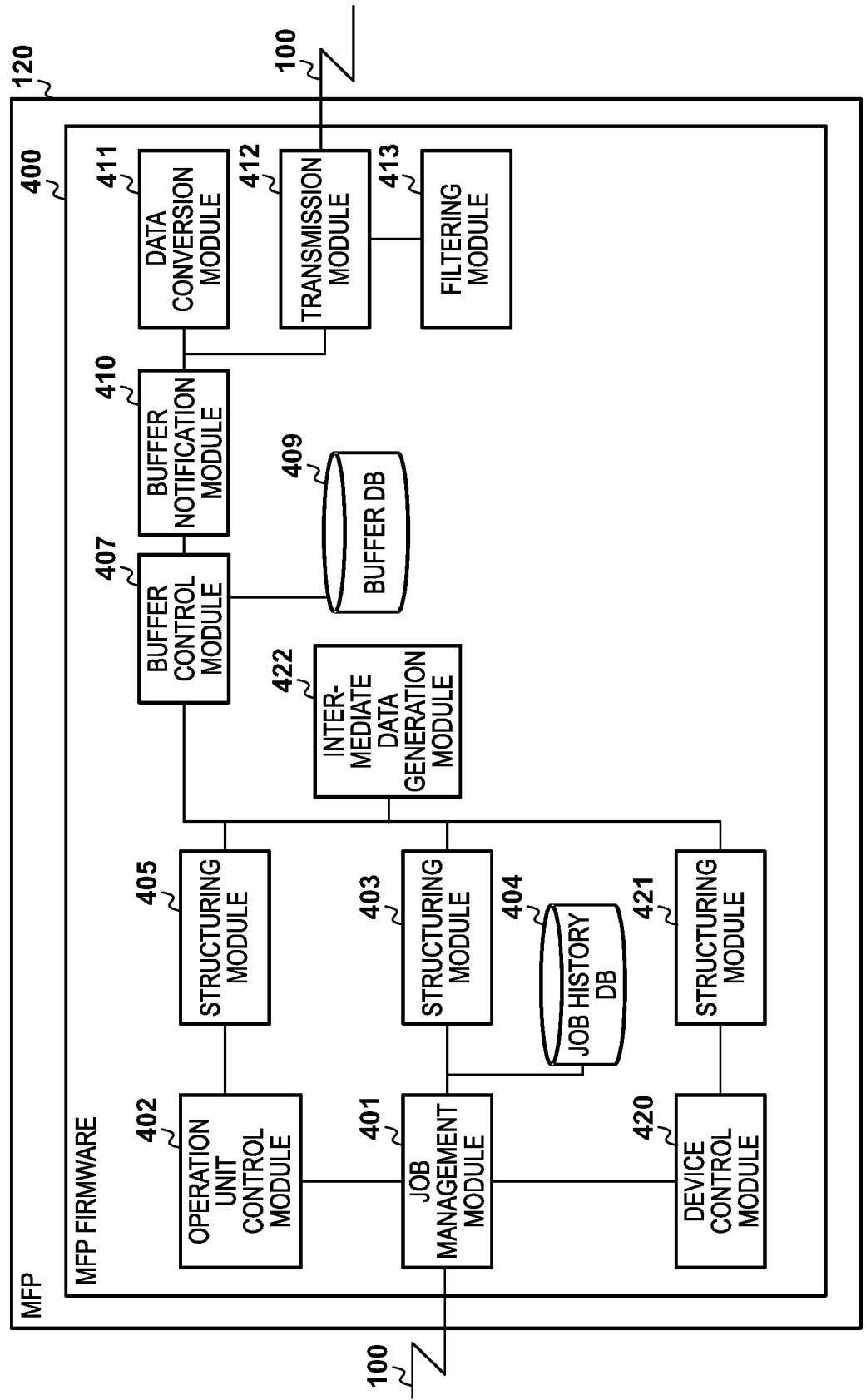
FIG. 4 is a block diagram illustrating an example of the software configuration of an MFP.

FIG. 4 is a block diagram illustrating an example of the software configuration of MFP firmware 400 running on the MFPs 120 according to the present embodiment. The MFP firmware 400 is stored in one of the storage devices, i.e., the ROM 302, the RAM 303, and the HDD 304, and is executed by the CPU 301.

A job management module 401 is connected to the network 100 through the network I/F 305. The job management module 401 receives a job, such as a print job, from an external apparatus using a specific communication protocol, and executes the received job. Additionally, upon receiving a notification pertaining to a job accepted by an operation unit control module 402, such as a copy job, a print job, or a scan job, the job management module 401 executes that job in accordance with the notification. Upon executing a job, the job management module 401 saves an execution history of that job in a job history DB (database) 404.

The job management module 401 also has a function for providing data pertaining to a job in response to an inquiry from another module, and a function for accepting an event subscription request from another module and transferring an event in accordance with the subscription request. The job management module 401 transfers the event when the execution state of the job has changed, such as when the job starts, is paused, and ends.

The job history DB 404 stores the execution history of the job. The execution history includes information pertaining to the execution of the job, such as a starting date/time and ending date/time of the job, a number of sheets supplied, a number of sheets discharged, whether or not staples are used, and so on. Note that the job execution history stored in the job history DB 404 is stored in the HDD 304.

The operation unit control module 402 receives data indicating the details of user operations, accepted by the operation unit 206, for instructing a job such as a copy job or a scan job to be executed, the data being received from the operation unit 206 through the operation unit I/F 306. The operation unit control module 402 has a function for transferring the details of the user operations accepted from the user to a structuring module 405.

A device control module 420 controls various devices (the printer 204 and the scanner 205) by controlling the printer controller 202 and the scanner controller 203 through the device controller I/F 308. Specifically, the device control module 420 accepts image data to be processed and control details from the job management module 401, and controls the printer controller 202 and the scanner controller 203 in accordance with the control details that have been accepted. The device control module 420 also has a function for transferring the control details of each device to a structuring module 421.

A structuring module 403 converts data output from the job management module 401 (i.e., data pertaining to the execution of a job) into structured data in accordance with a predetermined data schema. The structuring module 405 converts data output from the operation unit control module 402 (i.e., data pertaining to user operations) into structured data in accordance with a predetermined data schema. The structuring module 421 converts data output from the device control module 420 (i.e., data pertaining to the control of the devices in the MFP 120) into structured data in accordance with a predetermined data schema.

As a result of the conversion, the above-described structuring modules generate data that can be interpreted by an intermediate data generation module 422. A process of adding a data creation date/time or a new UUID (Universal Unique ID) for uniquely identifying the data, and a process of converting the data into data having a predetermined hierarchical structure or format, can be given as specific examples of the data conversion. These conversions are carried out in order to handle multiple types of data in a unified manner, or to process data, in which information is encoded or simplified to improve the efficiency of processing, to make later analysis easier. In addition to the above-described processing, the above-described structuring modules may furthermore subject the data to be transmitted to the management server 110 to data structure-related preprocessing as necessary.

In this manner, the structuring modules 403, 405, and 421 collect data produced in association with processing carried out in the MFP 120 and generate data to be provided to the intermediate data generation module 422.

The intermediate data generation module 422 converts the data, generated by the structuring modules 403, 405, and 421 and expressed by a predetermined format, into intermediate data, which is data in a data format that can be preserved for the purpose of buffering. In the present embodiment, a data format (a first data format) that is different from a data format used for transmission to the external management server 110 (a second data format) is used as the data format of the intermediate data. A format that enables the event log to be buffered efficiently in the MFP 120 can be employed as the first data format.

Using a data format that reduces the data size as much as possible as the data format of the intermediate data makes it possible to increase the amount of data that can be accumulated in a buffer DB 409. For example, a data format such as CBOR (Concise Binary Object Representation), which makes the data size variable depending on the range, may be used, or a coding format such as Huffman coding may be used. Alternatively, these formats may be combined. Particularly, a data format having a smaller data size than the data format (the second data format), which is used for transmission to the management server 110 and can be interpreted by the management server 110, may be used for the intermediate data accumulated (buffered) in the buffer DB 409.

A buffer control module 407 stores the intermediate data generated by the intermediate data generation module 422 in the buffer DB 409 so as to buffer the intermediate data. In other words, the buffer control module 407 buffers the data collected by the structuring modules 403, 405, and 421 in the buffer DB 409 in the data format used for transmission to the management server 110.

The buffer DB 409 is provided as a buffer for compensating for a difference between the timing at which the intermediate data is generated and the timing at which that intermediate data is transmitted to the management server 110 as an event log. For example, intermediate data generated and buffered while communication with the management server 110 is suspended due to a communication failure or the like continues to be held in the buffer DB 409 until communication with the management server 110 is once again possible. Once communication with the management server 110 is again possible, the intermediate data held in the buffer DB 409 is sequentially transmitted (the data after conversion by a data conversion module 411 is transmitted). The buffer control module 407 deletes, from the buffer DB 409, the intermediate data (data in the first data format) corresponding to data that has been successfully transmitted by a transmission module 412.

The buffer control module 407 also has a function for instructing a buffer notification module 410 to notify the buffer DB 409 regarding the buffering of the intermediate data (event log). Upon receiving the notification from the buffer control module 407, the buffer notification module 410 sends a storage notification, indicating that the intermediate data (the event log) has been stored in the buffer DB 409, to the transmission module 412.

The data conversion module 411 converts the intermediate data, generated by the intermediate data generation module 422 and corresponding to the event log (data in the first data format), into data in a data format that can be interpreted by the management server 110 (data in the second data format). In the present embodiment, the data format of the event log generated as a result of the conversion by the data conversion module 411 (the second data format), is the JSON (JavaScript™ Object Notation) format, for example. The JSON format is a data format that is widely used in communications in the Internet. Using a typical data format in this manner makes it possible to increase the level of interoperability among the various types of software used to process, analyze, or visualize the event logs.

In this manner, before transmitting the intermediate data buffered in the buffer DB 409, the data conversion module 411 converts the format of the intermediate data into a data format used for transmission to the management server 110 (the JSON format, in the present embodiment).

The transmission module 412 transmits the data, which has been converted by the data conversion module 411, to the management server 110 over the network 100 as an event log of the MFP 120. A filtering module 413 carries out a filtering process of confirming the details of the event log to be transmitted by the transmission module 412 and determining whether or not that event log should actually be transmitted to the management server 110. The transmission module 412 transmits the event log to the management server 110 in accordance with the result of the determination by the filtering module 413.

Event Log Buffering Process

Figure 5:
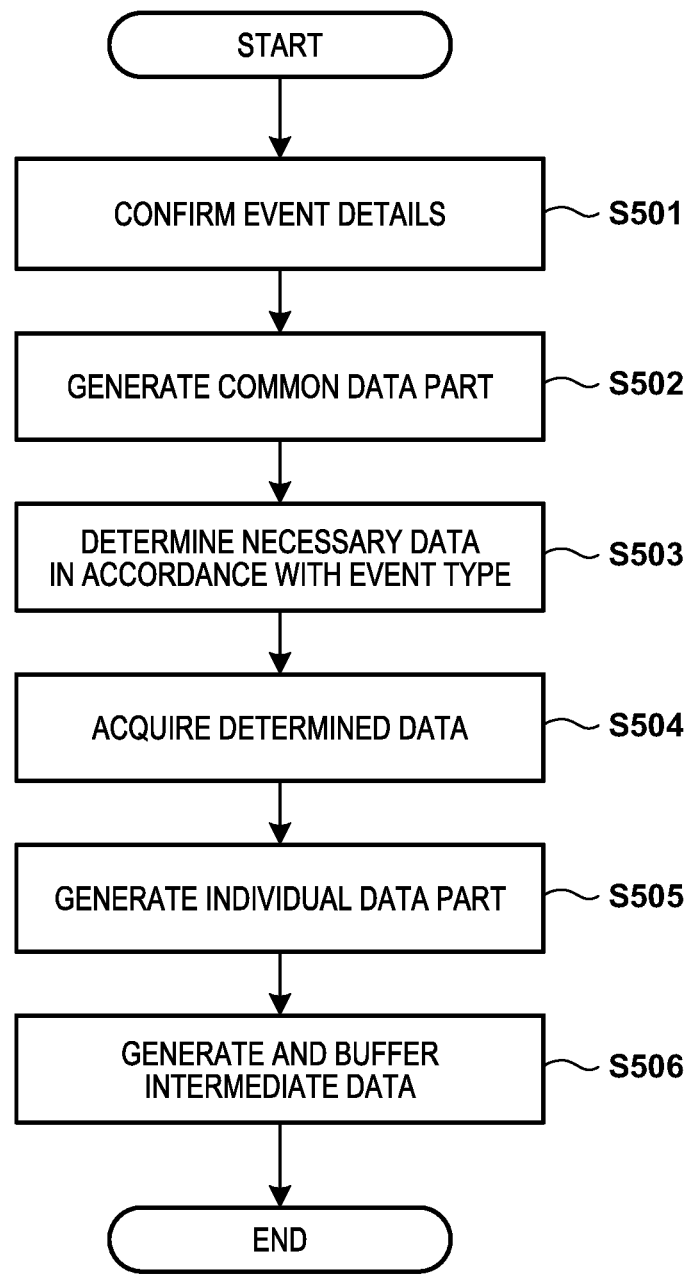
FIG. 5 is a flowchart illustrating a processing sequence for temporarily accumulating event logs.

FIG. 5 is a flowchart illustrating a sequence of processes for buffering the event log as intermediate data. The processes in each step of this flowchart can be realized by the CPU 301 loading computer programs stored in the ROM 302 or the HDD 304 into the RAM 303 and executing those programs as necessary. In preparation for executing the processing realized by the sequence of this flowchart, the structuring module 403 makes the event subscription request to the job management module 401 when the MFP firmware 400 is launched in order to acquire event data necessary for generating the intermediate data. When an event is transferred from the job management module 401 in response to the event subscription request, the structuring module 403 starts the processing realized by the sequence of this flowchart.

Upon receiving event data from the job management module 401, in S501, the structuring module 403 confirms the details of the event indicated by the received event data. The details of the event being confirmed include an event type. The event type corresponds to specific details of the change in the execution state of the job, such as the timing of the job starting, being paused, or ending.

When the details of the event have been successfully confirmed, in S502, the structuring module 403 generates a common data part, which constitutes part of the data to be included in the intermediate data, on the basis of the confirmed event details.

The common data part is constituted by information that is always added to the intermediate data, regardless of the specific details of the event. The common data part is constituted by the event occurrence date/time, the event type, an ID of the apparatus in which the event occurred, and the like, for example. Note that the structuring module 403 causes the intermediate data generation module 422 to generate the common data part by transmitting information necessary for generating the common data part to the intermediate data generation module 422.

Next, in S503, the structuring module 403 determines data that should be included in the intermediate data (data necessary for generating the intermediate data) in accordance with the event type confirmed in S501. If the event type is a job start event, for example, data indicating the party that input the job, the type of the job (e.g., copying or printing), and the like is determined as the necessary data. If the event type is a job end event, data indicating whether the job was successfully executed or the like is determined as the necessary data. Note that the data determined here is not limited to these data, and the data may be determined through any desired method.

Once the necessary data has been determined, the structuring module 403 acquires the determined data from the job management module 401 in S504. In this manner, the structuring module 403 collects data pertaining to an event occurring in the MFP 120 in accordance with the event type. Furthermore, in S505, the structuring module 403 generates an individual data part, which constitutes part of the data to be included in the intermediate data and is defined individually for each event type, in accordance with a predetermined data schema.

The data schema used in S505 defines an identifier applied to each piece of data, and a hierarchical structure used throughout the data. The data schema also includes definitions that, for example, associate a character string reading "JobCreator", used for identification, with data of the party that input the job. Note that information pertaining to the data schema may be included in a program corresponding to the structuring module 403, or may be stored in the HDD 304 separate from that program and read out from the HDD 304 as necessary. Note that the structuring module 403 causes the intermediate data generation module 422 to generate the individual data part by transmitting information necessary for generating the individual data part to the intermediate data generation module 422.

Finally, in S506, the structuring module 403 generates the intermediate data by concatenating the common data part generated in S502 and the individual data part generated in S505, and transmits the generated intermediate data to the buffer control module 407. As a result, the buffer control module 407 stores (buffers) the received intermediate data in the buffer DB 409, and notifies the buffer notification module 410 that the intermediate data has been buffered. This ends the processing realized by the sequence illustrated in FIG. 5.

In this manner, a process is realized for buffering the data collected by the structuring module 403 (the event log) in the buffer DB 409 as intermediate data having a different data format from the data format used for transmission to the management server 110. Note that a process for buffering the data collected by the structuring modules 405 and 421 (the event logs) in the buffer DB 409 as intermediate data having a different data format from the data format used for transmission to the management server 110 can be realized through the same processing.

Event Log Transmission Process

FIG. 6 is a flowchart illustrating a sequence of processes for transmitting the event log, which has been buffered as intermediate data, to the management server 110. The processes in each step of this flowchart can be realized by the CPU 301 loading computer programs stored in the ROM 302 or the HDD 304 into the RAM 303 and executing those programs as necessary. The processing realized by the sequence of this flowchart is started upon the intermediate data generated by the intermediate data generation module 422 being accepted by the buffer control module 407 and stored in the buffer DB 409.

Upon storing the intermediate data generated by the intermediate data generation module 422 in the buffer DB 409, in S601, the buffer control module 407 transfers a storage notification for the intermediate data to the transmission module 412 through the buffer notification module 410. When making this notification, the buffer notification module 410 converts the intermediate data into data in the data format for transmission to the management server 110 (the JSON format, in the present embodiment) using the data conversion module 411.

Upon receiving the storage notification for the intermediate data (the event log) from the buffer notification module 410, in S602, the transmission module 412 determines whether or not to actually transmit that event log to the management server 110. If the transmission module 412 has determined to transmit the event log to the management server 110, the process moves to S603, whereas if the transmission module 412 has determined not to transmit the event log, the process moves to S604.

In the present embodiment, to make this determination, the transmission module 412 supplies the event log to the filtering module 413 and inquires with the filtering module 413 as to whether or not the event log should be transmitted to the management server 110. This filtering process is carried out in order to reduce the amount of data transmitted in accordance with the conditions of the communication line, or so that the management server 110 can acquire specific events only from apparatuses which are in a predetermined state, for example.

In S603, the transmission module 412 transmits the event log to the management server 110 through the network I/F 305 and the network 100. HTTP (Hypertext Transfer Protocol), for example, is used as the communication protocol for transmitting the event log. In this case, the event log in the JSON format is transmitted to the management server 110 in the payload of the HTTP data. Note that a communication protocol aside from HTTP may be used to transmit the event log. For example, a protocol such as MQTT (Message Queue Telemetry Transport) can be used to transmit the event log. Once the transmission module 412 has successfully transmitted the event log to the management server 110, the process moves to S604.

In S604, the transmission module 412 notifies the buffer control module 407 that the event log has been successfully transmitted. In response, the buffer control module 407 deletes, from the buffer DB 409, the intermediate data (data in the first data format) corresponding to data that has been successfully transmitted. This ends the processing realized by the sequence illustrated in FIG. 6.

Although the buffer DB 409 is managed within the MFP firmware 400 in the present embodiment, it should be noted that a configuration in which a buffer DB server that manages the buffer DB 409 is located on the network 100 can also be employed. With this configuration, the MFP 120 transmits the intermediate data to the buffer DB server. The buffer DB server buffers the intermediate data received from the MFP 120, converts the intermediate data into the event log data format (the JSON format or the like) as appropriate, and transmits the event log to the management server 110.

As described thus far, according to the present embodiment, the structuring modules 403, 405, and 421 collect data produced in association with processing carried out in the MFP 120. The buffer control module 407 buffers the data collected by the structuring modules in the buffer DB 409, in the first data format (the CBOR format or the like) different from the second data format (the JSON format or the like), which is used for transmission to the external management server 110. Before the data buffered by the buffer control module 407 is transmitted to the management server 110, the data conversion module 411 converts the format of the data from the first data format to the second data format. The transmission module 412 transmits the data in the second data format, after the conversion by the data conversion module 411, to the management server 110, as an event log of the MFP 120.

In this manner, according to the present embodiment, the MFP 120 buffers the event log in a data format (the CBOR format or the like) different from the data format (the JSON format or the like) used when transmitting the event log to the management server 110. Accordingly, the event log can be transmitted in a data format suited to the management server 110 (a data format that can be interpreted or easily processed by the management server 110), while efficiently buffering the event log in the MFP 120. In particular, by using a data format which has a smaller size than the data format used when transmitting the event log to the management server 110 as the data format for the buffered intermediate data, the amount of data that can be buffered in the MFP 120 can be increased. As a result, the likelihood that event logs to be transmitted will be lost if, for example, communication with the management server 110 is cut off, can be reduced.

Second Embodiment

In a second embodiment, the data format of the data stored (buffered) in the buffer DB 409 is changed as necessary in the above-described MFP 120, which makes it possible to carry out the process of transmitting the event log efficiently. Descriptions of parts identical to those in the first embodiment will be omitted in the following.

In the present embodiment, the structuring module 403 executes the following processing in S505 of the flowchart in FIG. 5. If the size of the individual data part of the intermediate data to be buffered is lower than a predetermined threshold (a first threshold), the structuring module 403 buffers that data in the buffer DB 409 in the data format used for transmission to the management server 110. In other words, the structuring module 403 stores data generated from the intermediate data by the data conversion module 411 in the buffer DB 409. Note that the structuring module 403 may carry out such control by comparing the size of data in which the individual data part and the common data part are concatenated with a predetermined threshold.

Additionally, if the number of data items (attributes or the like) included in the individual data part is lower than a predetermined threshold (a second threshold), the structuring module 403 may buffer that data in the buffer DB 409 in the data format used for transmission to the management server 110. For data buffered in the buffer DB 409 in the data format for transmission (the JSON format or the like), the transmission module 412 transmits the buffered data as-is to the management server 110 as an event log in S603.

In this manner, switching the data format as necessary when buffering data in the buffer DB 409 makes it possible to increase the speed of processing involved in the transmission to the management server 110. Specifically, if the size of the intermediate data is small, there is only a small difference between the data size of the CBOR format used for the intermediate data and the JSON format used for the data being transmitted, for example. In such a case, converting the intermediate data into data for transmission and buffering that data in order to skip the data format conversion when transmitting the data may be prioritized over buffering the intermediate data and reducing the size of the data stored in the buffer DB 409. This makes it possible to improve the efficiency of the processing by the MFP 120 involved in transmitting the event log.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-035420, filed Feb. 28, 2018, which is hereby incorporated by reference herein in its entirety.

What is claimed is:

1. An information processing apparatus comprising:
a memory storing instructions, and
at least one processor executing the instructions causing the information processing apparatus to:
collect data produced in association with processing carried out by the information processing apparatus;
if a size of the collected data in a first data format is smaller than a first threshold or if a number of attributes included in the collected data in the first data format is lower than a second threshold,
convert the format of the collected data from the first data format into a second data format used for transmission to an external server apparatus, and then buffer the data in the second data format, and transmit the buffered data in the second data format to the server apparatus as an event log of the information processing apparatus; and
if the size of the collected data in the first data format is not smaller than the first threshold and if the number of attributes included in the collected data in the first data format is not lower than the second threshold,
buffer the collected data in the first data format, and convert the format of the buffered data from the first data format to the second data format, and then transmit the data in the second data format to the server apparatus as an event log of the information processing apparatus,
wherein a size of data is increased by the conversion of the format from the first data format to the second data format.

2. The information processing apparatus according to claim 1,
wherein the second data format is a data format that can be interpreted by the server apparatus.

3. The information processing apparatus according to claim 1,
wherein the instructions further cause the information processing apparatus to, once the transmission of the data in the second data format is complete, delete the data in the first data format, corresponding to the data for which the transmission is complete, from the buffered data.

4. The information processing apparatus according to claim 1,
wherein the collected data is collected in accordance with a type of event that has occurred in the information processing apparatus.

5. The information processing apparatus according to claim 1,
wherein the collected data is at least one of data pertaining to the execution of a job in the information processing apparatus, data pertaining to control of a device included in the information processing apparatus, and data pertaining to a user operation made in an operation unit of the information processing apparatus.

6. A method for controlling an information processing apparatus, the method comprising:
collecting data produced in association with processing carried out by the information processing apparatus;
if a size of the collected data in a first data format is smaller than a first threshold or if a number of attributes included in the collected data in the first data format is lower than a second threshold,
converting the format of the collected data from the first data format into a second data format used for transmission to an external server apparatus, and then buffering the data in the second data format, and transmitting the buffered data in the second data format to the server apparatus as an event log of the information processing apparatus; and
if the size of the collected data in the first data format is not smaller than the first threshold and if the number of attributes included in the collected data in the first data format is not lower than the second threshold,
buffering the collected data in the first data format, and converting the format of the buffered data from the first data format to the second data format, and then transmitting the data in the second data format to the server apparatus as an event log of the information processing apparatus,
wherein a size of data is increased by the conversion of the format from the first data format to the second data format.

7. A non-transitory computer-readable storage medium storing a computer program for causing a computer to execute a method for controlling an information processing apparatus, the method comprising:
collecting data produced in association with processing carried out by the information processing apparatus;
if a size of the collected data in a first data format is smaller than a first threshold or if a number of attributes included in the collected data in the first data format is lower than a second threshold,
converting the format of the collected data from the first data format into a second data format used for transmission to an external server apparatus, and then buffering the data in the second data format, and transmitting the buffered data in the second data format to the server apparatus as an event log of the information processing apparatus; and
if the size of the collected data in the first data format is not smaller than the first threshold and if the number of attributes included in the collected data in the first data format is not lower than the second threshold,
buffering the collected data in the first data format, and converting the format of the buffered data from the first data format to the second data format, and then transmitting the data in the second data format to the server apparatus as an event log of the information processing apparatus,
wherein a size of data is increased by the conversion of the format from the first data format to the second data format.

* * * * *